United States Patent [19]

Koiwai et al.

[11] Patent Number: 5,303,273
[45] Date of Patent: Apr. 12, 1994

[54] APPARATUS FOR ASSEMBLING NUCLEAR FUEL ASSEMBLY

[75] Inventors: Taichi Koiwai; Katsunori Ohuchi; Akio Sando, all of Ibaraki, Japan

[73] Assignee: Mitsubishi Nuclear Fuel Co., Tokyo, Japan

[21] Appl. No.: 996,065

[22] Filed: Dec. 23, 1992

[30] Foreign Application Priority Data

Dec. 26, 1991 [JP] Japan .................................. 3-357763

[51] Int. Cl.$^5$ ........................................... G21C 21/00
[52] U.S. Cl. ........................................................ 376/261
[58] Field of Search .................... 376/261, 260; 29/723, 29/906

[56] References Cited

U.S. PATENT DOCUMENTS

| | | | |
|---|---|---|---|
| 4,229,259 | 10/1980 | Vaill et al. | 29/723 |
| 4,651,403 | 3/1987 | DeMario et al. | 376/261 |
| 4,664,874 | 5/1987 | Shallenberger et al. | 376/261 |
| 4,740,351 | 4/1988 | Katsumizu et al. | 376/261 |
| 5,068,081 | 11/1991 | Oyama et al. | 376/261 |

FOREIGN PATENT DOCUMENTS

| | | |
|---|---|---|
| 0017508 | 10/1980 | European Pat. Off. . |
| 0196609 | 10/1986 | European Pat. Off. . |
| 0223342 | 5/1987 | European Pat. Off. . |
| 0284814 | 10/1988 | European Pat. Off. . |
| 2560423 | 2/1985 | France . |

*Primary Examiner*—Daniel D. Wasil
*Attorney, Agent, or Firm*—Oblon, Spivak, McClelland, Maier & Neustadt

[57] ABSTRACT

An apparatus for assembling a nuclear fuel assembly is disclosed. The apparatus includes a deflecting device which is disposed adjacent to the grid and deflects grid springs away from dimples opposing thereto. The deflecting device includes a tubular member, a rod member and a drive mechanism. The tubular member has a plurality of circumferentially divided sleeve pieces. The rod member is releasably inserted in the tubular member for sliding movement therealong. The drive mechanism is drivingly connected to the rod member and moves the rod member in the tubular member in a longitudinal direction thereof to bring the rod member into urging engagement with the sleeve pieces of the tubular member, whereby the sleeve pieces are deflected to be urged against the spring to deflect the same.

13 Claims, 8 Drawing Sheets

APPARATUS FOR ASSEMBLING NUCLEAR FUEL ASSEMBLY

BACKGROUND ART

This application claims the priority of Japanese Patent Application No. 3-357763 filed Dec. 26, 1991, which is incorporated herein by reference.

The present invention pertains to an apparatus for assembling a nuclear fuel assembly.

Figure 6:
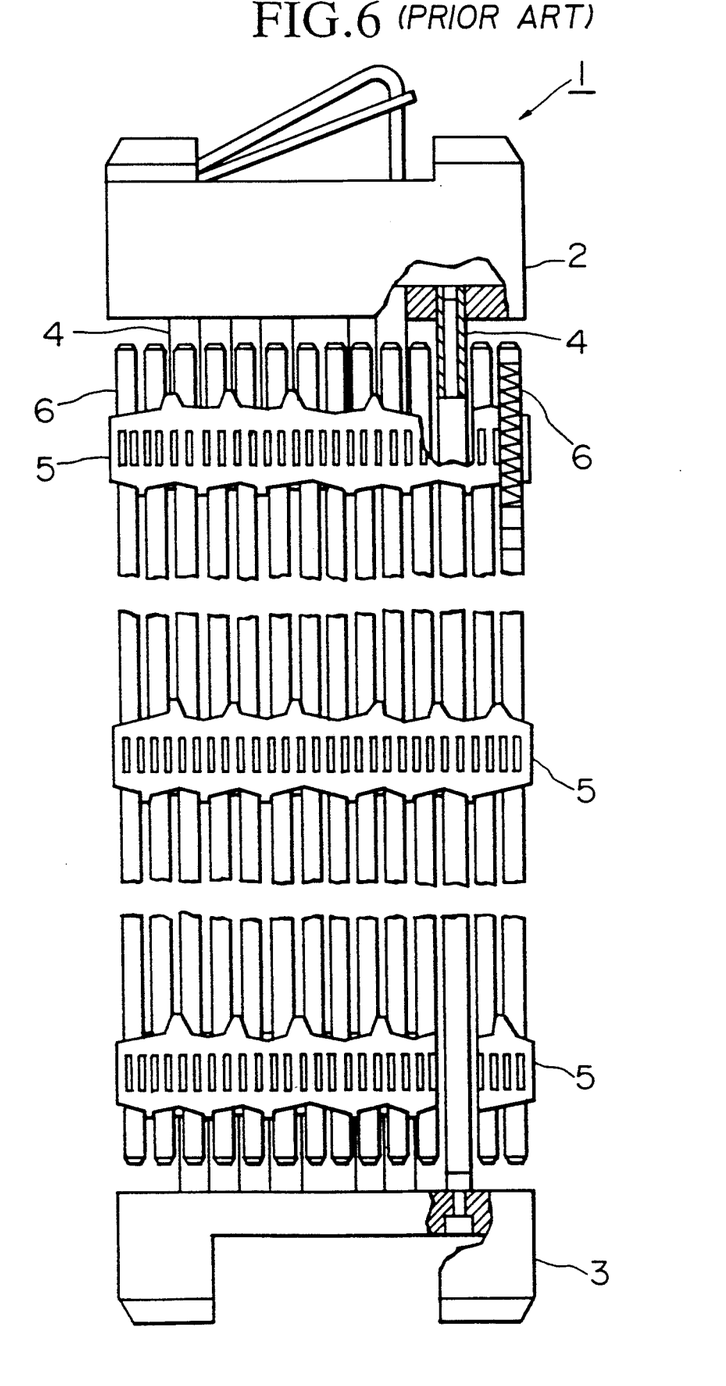
FIG. 6 is a front elevational view of a nuclear fuel assembly.

FIG. 6 depicts a known nuclear fuel assembly which is mounted on a nuclear reactor such as a pressurized water reactor. The assembly, generally designated at 1, includes a pair of top and bottom nozzles 2 and 3 arranged in a facing relation to each other and in a vertically spaced relation to each other. A plurality of guide pipes 4 such as control-rod guide pipes or instrument pipes are disposed so as to extend between the top and bottom nozzles 2 and 3, and fixedly secured thereto. A plurality of grids 4 are secured to the intermediate portions of the guide pipes 5 so as to be vertically spaced from one another, and a plurality of fuel rods 6 are inserted through and supported by the grids 4 so as to extend parallel to the guide pipes 5.

Figure 7:
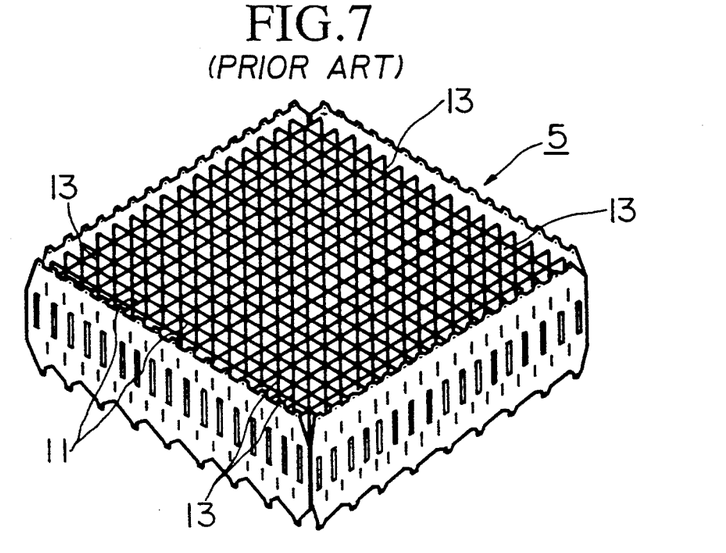
FIG. 7 is a perspective view of the nuclear fuel assembly grid.
Figure 8:
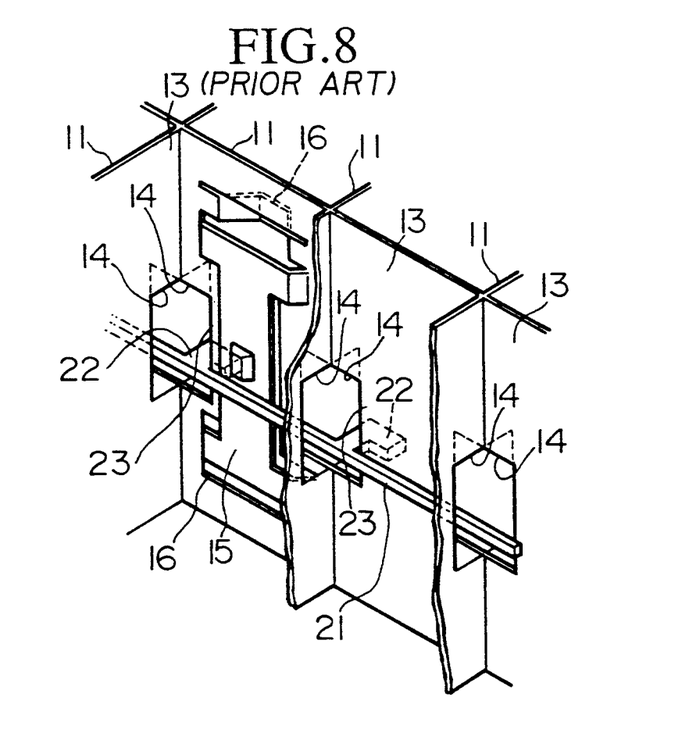
FIG. 8 is a fragmentary enlarged perspective view showing a key member inserted in the grid for maintaining the grid spring deflected.

As shown in FIGS. 7 and 8, each grid 5 is formed as follows. A plurality of straps 11, each in the form of a thin strip sheet, are assembled perpendicularly to each other into a grid 5 to define a number of grid cells 13. Springs 15 and dimples 16 for supporting a respective fuel rod 6 are formed on the walls of each grid cell in opposed relation to each other. More specifically, as shown in FIG. 8, a single spring 15 is formed on one side of each wall of the grid cell 13, while a pair of dimples 16 are formed on the other side of the same wall defining adjacent grid cell so as to sandwich the aforesaid spring 15, and a spring 15 and a pair of dimples 16 are opposed to each other and protrude into the same grid cell 13. Each fuel rod 6, which is inserted into the grid cell 13, is supported by being urged to the dimples 16 by the spring 15 opposing thereto. Furthermore, rectangular cut-outs 14 or openings are formed at the intersections of the straps 11. Those wall portions which sandwich the spring 15 therebetween and are spaced apart from each other in the longitudinal direction of the strap serve as ribs 23 with which hook portions 22 of a key member 21 are held in engagement.

A conventional method for inserting the fuel rods 6 in the grid 5 thus constructed will now be described.

Figure 9:
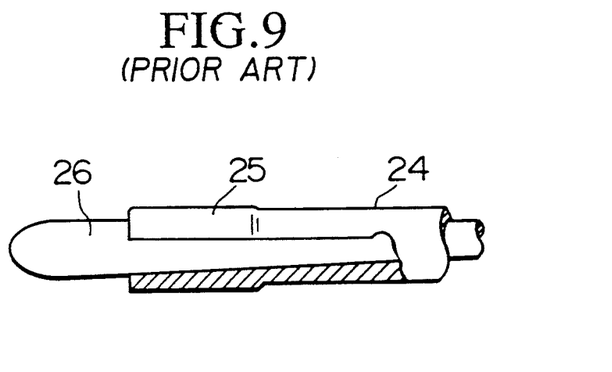
FIG. 9 is a partially cut-away, side elevational view of a conventional deflecting jig used in assembling the nuclear fuel assembly.
Figure 10:
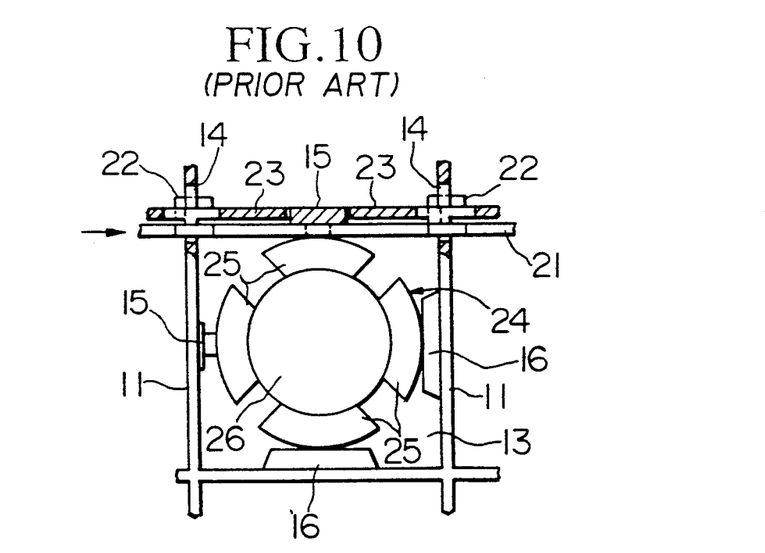
FIG. 10 is a sectional view of the straps, showing conventional assembling procedures.

First, a deflecting jig 24 as shown in FIG. 9 is inserted through the grid cell 13. The deflecting jig 24 comprises a cylindrical jig body 25 divided at its forward portion into four pieces, and a tapered pin 26 inserted in the jig body 25 for sliding movement therealong. When the tapered pin 26 is withdrawn or retracted in its axial direction while holding the deflecting jig 24 in the grid cell 13, the jig body 25 is enlarged to deflect the springs 15 as shown in FIG. 10.

Subsequently, an elongated key member 21 of a generally rectangular cross-section is inserted into the cut-outs 14 from the lateral side of the grid 12, to bring the hooks 22 of the key member 21 into engagement with the ribs 23 to keep the springs deflected. Then, the deflecting jig 24 is removed from the grid.

Thereafter, the fuel rod 6 is inserted in the grid cell 13, and the key member 21 is removed from the grids to release constriction of the spring. Thus, the fuel rod 6 is secured by being resiliently urged by the springs 15 toward the dimple 16 opposing thereto.

However, inasmuch as the aforesaid tasks of deflecting the springs 15 and inserting the key member 21 are carried out manually, they are labor-intensive and time-consuming, resulting in low operational efficiency.

Furthermore, the task of deflecting the springs 15 using the aforesaid deflecting jig 24 must be carried out carefully so as not to cause any twisting or shifting to the springs 15, without exerting any force thereon in a direction other than the acting direction of the spring 15. Therefore, the deflecting task requires a high level of skill, so that it has been desired to improve this task and achieve standardization of the operating procedure.

SUMMARY OF THE INVENTION

It is therefore the object of the present invention to provide an apparatus for assembling a nuclear fuel assembly which solves the aforesaid problems and achieves substantial reduction in working time and cost.

According to the present invention, there is provided an apparatus for assembling a nuclear fuel assembly which includes a grid for supporting a plurality of fuel rods, the grid having a plurality of straps intersecting each other to define a plurality of grid cells therein, and a plurality of pairs of dimples and springs provided on the straps for supporting the fuel rods, the dimple and the spring being disposed in facing relation to each other, on wall portions of the straps, which cooperate with each other to define the grid cells, the dimple and the spring projecting into the grid cell, the apparatus comprising:

deflecting means disposed adjacent to the grid for deflecting the spring away from the dimple opposing thereto;

the deflecting means including a tubular member defining a plurality of circumferentially divided sleeve pieces, a rod member releasably inserted in the tubular member for sliding movement therealong, and drive means drivingly connected to the rod member for moving the rod member in the tubular member in a longitudinal direction thereof to bring the rod member into urging engagement with the sleeve pieces of the tubular member, whereby the sleeve pieces are deflected to be urged against the spring to deflect the same.

In the foregoing apparatus, when the drive means is actuated, the rod member which is inserted in advance in the tubular member is moved by the drive means in a longitudinal direction thereof, and the rod member is brought into urging engagement with the sleeve pieces of the tubular member, so that the sleeve pieces are deflected to be urged against the spring to deflect the same. Thus, the deflecting operation of the spring on the strap of the grid can be mechanically carried out very efficiently by operating the apparatus, thereby achieving substantial reduction in working time and cost.

DETAILED DESCRIPTION OF THE INVENTION

FIGS. 1 to 4 depict an apparatus for assembling a nuclear fuel assembly in accordance with an embodiment of the present invention. The apparatus, generally designated at 31, comprises a main device 32, a maintaining device or means 33 disposed adjacent to the main device 32, and a moving device or means 34 attached to the main device 32.

Figure 1:
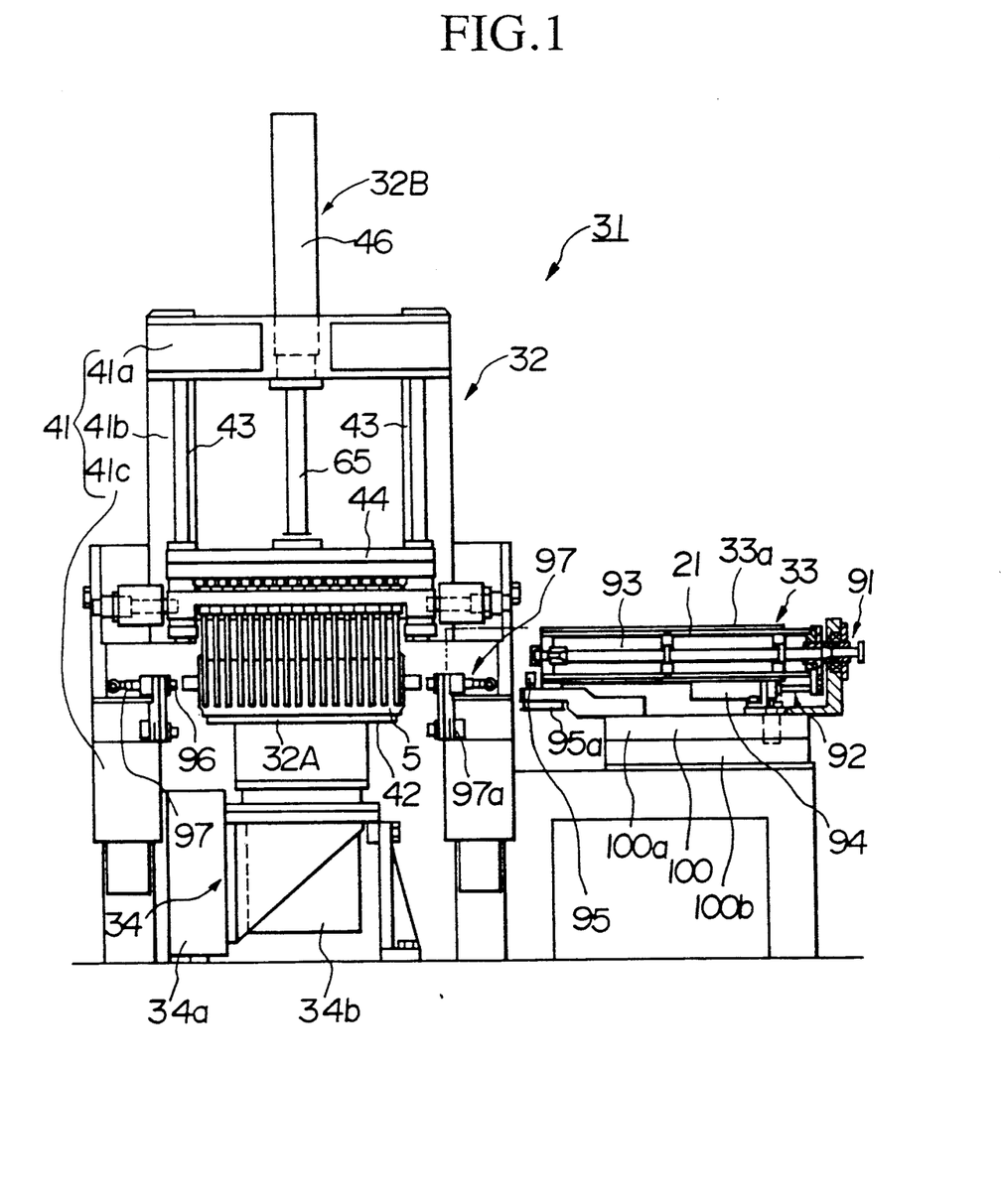
FIG. 1 is a front elevational view of an apparatus for assembling a nuclear fuel assembly in accordance with an embodiment of the present invention.
Figure 2:
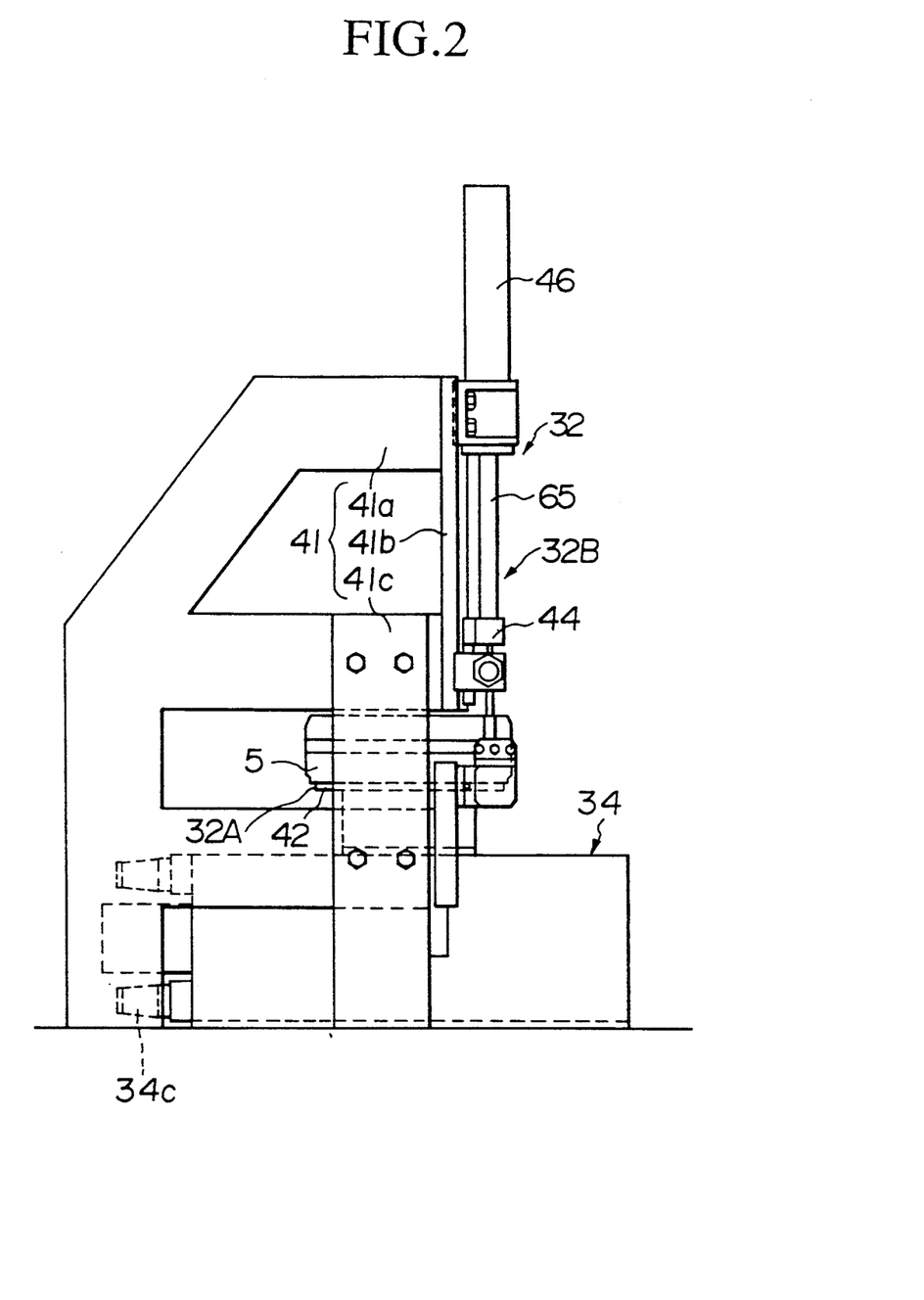
FIG. 2 is a side elevational view of the apparatus of FIG. 1.

Referring to FIGS. 1 and 2, the main device 32 includes holding means 32A having a tray 42 for holding a grid 5 thereon, and a deflecting device or means 32B for deflecting the springs 15 away from the dimple 16 opposing thereto. Roughly, the deflecting device 32B includes a frame 41, a pair of right and left guide rods 43, a rod support or a first support member 44, a tool support or a second support member 45, and drive means in the form of a hydraulic cylinder 46.

The frame 41 includes an upper frame 41a, a pair of right and left side flames 41b and a pair of right and left bottom flames 41c. The tray 42 of the holding means is disposed at a central portion of the main device 32, i.e., between the right and left side flames 41b, and is supported on a top portion 51a of a vertically extending shaft 51 which is, as will be described later, constructed so as to be rotatable about its axis. Positioning members 52 are securely mounted on the corners of the upper surface of the tray 42 for positioning the grid 5 in place. In addition, a pair of horizontally-extending rail guides 53 are securely fixed to the side frames 41b at their inner faces, while a pair of sliding rails 54 are securely fixed to the side plates of the tray 42, respectively. Thus, the tray 42 is constructed so as to be movable with its rails 54 being slidably supported on the rail guides 53, respectively. Furthermore, a pair of stopper members 55 each carrying a protruding member threaded thereinto are securely fixed to the side frames 41b. These stopper members 55 are arranged so that when the tray 42 is transferred from a position adjacent to the main device 32 into a prescribed position between the frames 41c, the protruding members are respectively brought into fitting engagement with holes 56 formed in the side plates of the tray 42, to thereby stop the tray 42 in place.

Furthermore, the pair of vertically extending guide rods 43 are arranged adjacent to the side frames 41b, respectively. The upper end of each guide rod 43 is fixedly secured to the upper frame 41a through a supporting sleeve 61, while the lower end of the guide rod 43 is fixedly secured to a bracket 62 which is fixed to a respective side frame 41b. The rod support 44, which is composed of an elongated rectangular plate, is arranged on the guide rods 43 for sliding vertical movement therealong. More specifically, a pair of through apertures 63 are formed in the rod support 44 at positions adjacent to the right and left ends, and each guide rod 43 is slidably inserted into a respective aperture 63 through a cylindrical sleeve 64 interposed therebetween. Furthermore, the hydraulic cylinder 46 is securely mounted on the center of the upper frame 41a with its piston rod 65a being directed downwards, and the piston rod 65a is connected at its free end to the center of the upper surface of the rod support 44. The rod support 44 carries at its lower surface a plurality of vertically downwardly extending rod members 66 arranged in line along the support 44, and each rod member 66, which has a conical-shaped lower end, is arranged so that its axis is aligned with the axis of a respective grid cell 13 in the grid 5. Thus, the rod support 44 is adapted to be moved up and down by the actuation of the hydraulic cylinder 46, and hence the rod members 66 are caused to move up and down. Additionally, the rod support 44 is provided with a pair of guide members 67 mounted on the right and left ends on the upper surface thereof. The function of these guide members will be later described.

Furthermore, under the rod support 44, the tool support 45 which is comprised of a elongated rectangular plate similar to the rod support 44, is supported on the guide rods 43 for sliding vertical movement therealong. As is the case with the rod support 44, a pair of through apertures 71 are formed in the tool support 45 at positions adjacent to the right and left ends, and each guide rod 43 is slidably inserted into a respective aperture 71 through a cylindrical sleeve 72 interposed therebetween. Formed in the tool support 44 are a plurality of rod-accommodating holes 73 which have a diameter slightly larger than that of the rod member 66 and are disposed in line at such positions as to be coaxial with the axes of the grid cells 13 of the grid 5. In addition, the tool support 44 carries at its lower surface a plurality of tools or tubular members 74 arranged in line along the support 44 so as to correspond to the rod members 66. Each tool 74 is securely fixed to the lower open end of a respective hole 73 through a suitable connecting sleeve, and arranged so that its axis is aligned with the axis of a respective grid cell 13 in the grid 5. Each tool 74 has two sleeve pieces or leaves divided circumferentially thereof, and is constructed such that when the rod member 66 is inserted thereinto, the divided sleeve pieces are enlarged or spread outwards.

Furthermore, attached to the rod support 44 and the tool support 45 are linkage means which associates the movement of the tool support 45 with the movement of the rod support 44 and dissociates the movement of the tool support 45 therefrom. More specifically, the linkage means includes an upwardly extending connecting rod or suspender 75, and stopper means disposed adjacent to the rod support 44 and the tool support 45 for stopping the tool support 45 in association with the movement of the rod support 44. The suspender 75 is extended through the rod support 44 to protrude upwardly therefrom, and engaging bolts 76 are threaded on the protruded end. The lower end of the suspender 75 is immovably secured to the tool support 45. Thus, when the rod support 44 is elevated by a prescribed distance from the tool support 45, the engaging bolts 76 of the suspender 75 are brought into engagement with the upper surface of the rod support 44. Therefore, when the rod support 44 is further moved upwards, the tool support 45 is also moved upwards following the movement of the rod support 44.

Furthermore, the supporting bracket 62 arranged under the shaft 43 has an upper surface defining a stopping face 77 adapted to receive the lower surface of the tool support 45 to thereby prevent the tool support 45 from further moving downwardly. In the position in which the tool support 45 is stopped by the stopping face 77, the lower ends of the tools 74 carried on the tool support 45 are extended through the grid cell 13 and protruded therefrom. In addition, the rod support 44, which is caused to stop on the tool support 45, is situated so that the lower ends of the rod members 66 carried thereon are also extended through the grid cell 13 and protruded therefrom.

Figure 4:
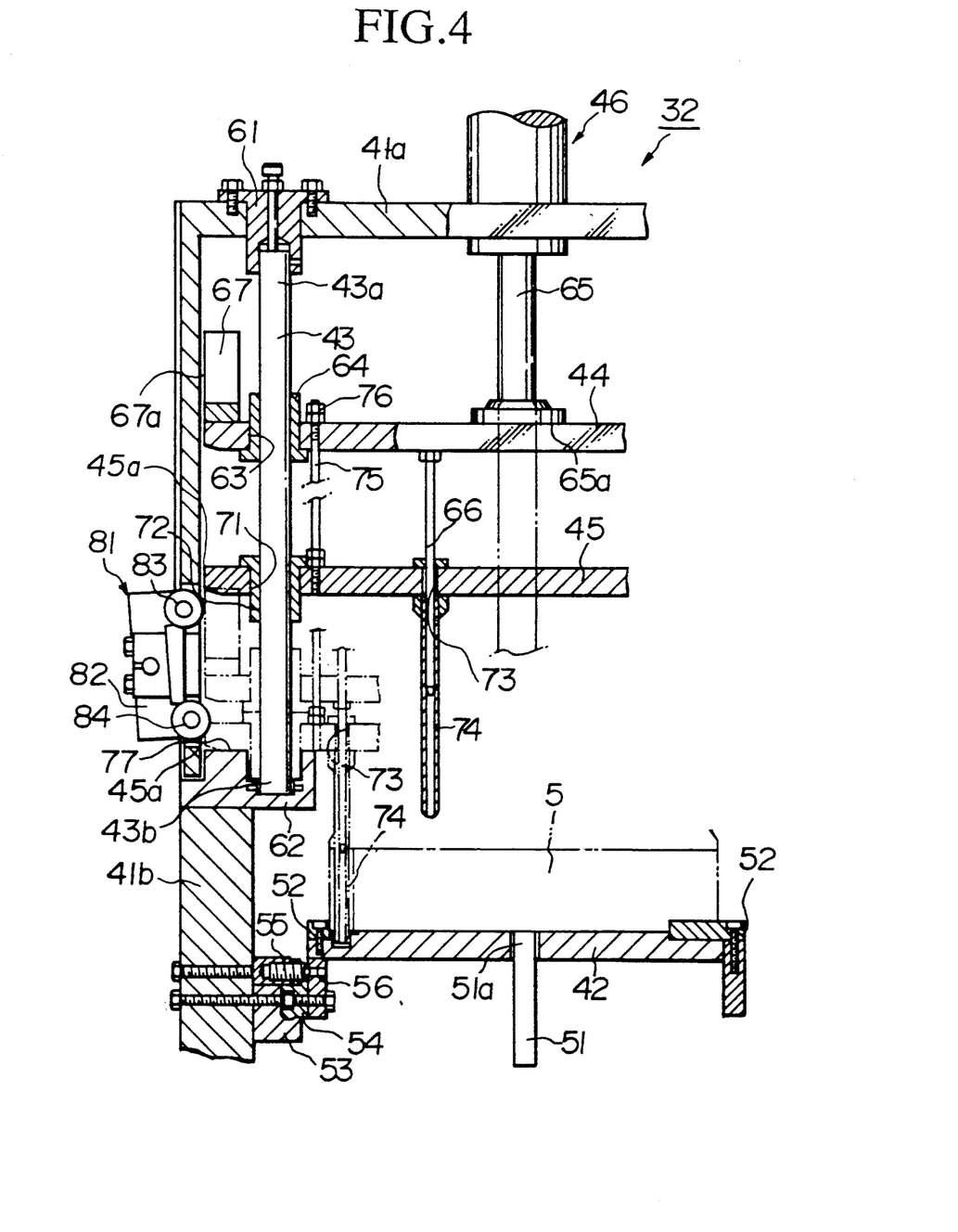
FIG. 4 is a cross sectional view of the apparatus of FIG. 1, showing how a deflecting device of the apparatus operates.

The stopper means of the linkage means shown in FIG. 4 includes a pair of swing roller assemblies 81 each mounted on a respective side frame 41b and positioned above the stopping face 77 of the bracket 62. Each swing roller assembly 81 has an arm 82 mounted on the side frame 41b so as to be pivotable about its center in a vertical plane, and a pair of rollers 83 and 84 mounted on the upper and lower ends of the arm 82 and disposed in vertically spaced relation from each other. The swing roller assembly 81 is of such a construction that the pivotal movement of the arm 82 permits either one of the two rollers 83 and 84 to approach the rod support 44 or the tool support 45. Thus, when the upper roller 83 of the swing roller assembly 81 is brought into rolling contact with a surface 67a of the guide member 67, the swing roller assembly 81 is caused to pivot counterclockwise in FIG. 4, and the lower roller 84 is brought into contact with the end portion 45a of the tool support 45, whereby the upward movement of the tool support 45 is prevented.

Figure 3:
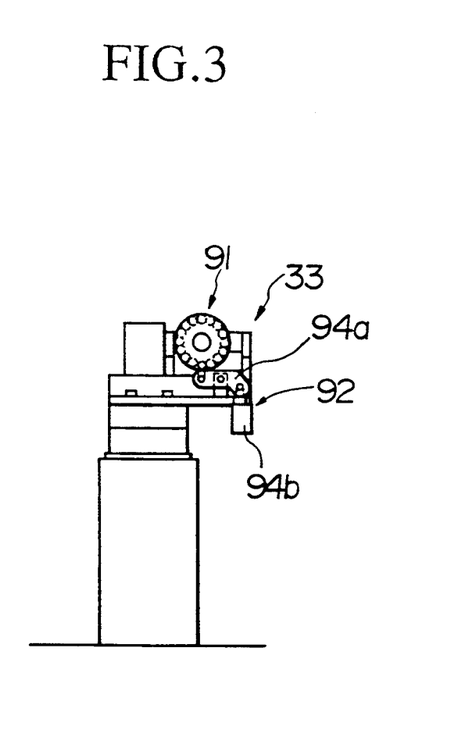
FIG. 3 is a side elevational view of a maintaining device used in the apparatus of FIG. 1.

The maintaining device 33 shown in FIGS. 1 and 3 is provided adjacent to the holding means for maintaining the springs 15 deflected, and comprises a plurality of key members 21 each adapted to be releasably inserted in the grid cell 13 of the grid 5 for maintaining the springs 15 deflected, a key-inserting device 33a or means provided for inserting the key member 21 into a prescribed position in the grid cells of the grid 5. The key-inserting device 33a includes a key-supplying mechanism 91 or means for supplying the key member 21 into a prescribed insertion position adjacent to the grid 5, and a key-transfer mechanism or means 92 for moving the key member 21 placed in the insertion position into a prescribed position in the grid 5.

The key-supplying mechanism 91 includes a cylindrical key cartridge 93 for releasably holding a plurality of key members 21, and a rotating mechanism attached to the cartridge 93 for rotating the key cartridge 93 about its axis to bring one of the key members 21 into the insertion position. The key cartridge 93 is constructed so as to be capable of holding a plurality of, e.g., thirty two key members 21 parallel to the axis of the cartridge 93.

The key-transfer mechanism 92 shown in FIG. 1 comprises an actuating cylinder 94 for pushing the key member 21 held at the insertion position in the key-cartridge 93 towards the grid 5 on the holding means, a pair of push-out rollers 95 provided for moving the pushed key member 21 a predetermined distance towards the grid 5, a forwarding mechanism 100 for further moving the key-cartridge 93 towards the grid 5 to complete the insertion of the key member 21, and a pair of key-rotating mechanisms 97 provided adjacent the grid 5 for rotating the key member 21 while holding the same.

The actuating cylinder 94 is provided with a generally L-shaped push-out member 94a mounted on its piston rod. The push-out member 94a is slidably supported at its one end on a shaft extending parallel to the actuating cylinder 94, and an auxiliary cylinder 94b for moving the shaft up and down is connected to the shaft, whereby when the auxiliary cylinder 94b is actuated, the push-out member 94a is pivoted about the rod of the cylinder 94 so that the other end of the push-out member 94a is moved into and out the key-cartridge 93.

An actuator, not shown, is operably connected to the push-out rollers 95 through a suitable belt and pulley transmission 95a to rotate the rollers 95. The forwarding mechanism 100 comprises a sliding table 100a slidably placed on a base 100b so as to be movable towards and away from the grid 5 on the holding means, and a drive mechanism, not shown, connected to the sliding table for moving the table 100a forwards and backwards.

Each of the key-rotating mechanisms 97 includes a holding member or portion 96 for holding the key member, a motor 97a for rotating the holding member through a suitable belt and pulley transmission to rotate the key member, and a suitable cylinder for moving the holding member towards and away from the grid. The holding member 96 of the key-rotating mechanism 97 disposed on the left side in FIG. 1 serves as a stopper for confirming that the insertion of the key member 21 into the prescribed position in the grid 5 is completed. Moreover, the key-rotating mechanism 97 disposed on the right side in FIG. 1 is provided with a cylinder (not shown) for moving the holding member 96 upwards and downwards.

Furthermore, the moving device 34 in FIG. 1 is provided adjacent to the holding means for moving the holding means into a shifted position, to thereby allow the maintaining device 33 to insert another key member 21 in another grid cell 13 of the grid 5 to maintain other springs 15 deflected. The moving device 34 includes a sliding block 34a supported on a rail for sliding movement therealong, a suitable table 34b fixedly secured to the sliding block 34a, and a suitable drive mechanism 34c for driving the sliding block 34a to move. Furthermore, the shaft 51 fixed to the holding tray 42 is constructed so as to be rotatable about its axis by a suitable drive means accommodated in the housing on the table 34b. Thus, the holding tray 42 is rotatable or indexable by 90 degrees, to thereby permit the insertion of the key members 21 perpendicular to the aforesaid direction.

Referring to FIGS. 5a to 5f, the procedures for deflecting the springs 15 in the grid cell 13 and inserting the key members 21 into prescribed positions using the aforesaid assembling apparatus will hereinafter be described.

(1) First, the piston rod 65 in FIG. 1 of the hydraulic cylinder 46 is caused to move upwards to thereby move the rod support 44 to an upper position of the main device 32. In addition, the grid 5 is received on the tray 42, and is moved to the position below the tool support 45 and the rod support 44. Thus, the tool support 45 is connected to the rod support 44 through the suspender 75, and is stopped at the upper position in the main device 32. In this condition, the rod members 66 of the rod support 44 are all inserted into the upper portions of the tools 74 on the tool support 45. However, nothing is inserted in the grid cell 13 of the grid 5 yet at this stage (see FIG. 5a).

(2) Then, the hydraulic cylinder 46 is actuated to cause the piston rod 65 to move downwardly to move the rod support 44 downwardly. With this procedure, the tool support 45, which is connected to the rod support 44 by the suspender 75, is caused to move downwardly by its own weight. As a result, the plurality of tools 74 on the tool support 45 are received into the grid cells 13 of the grid 5 on the tray 42 (see FIG. 5b).

Figure 5A:
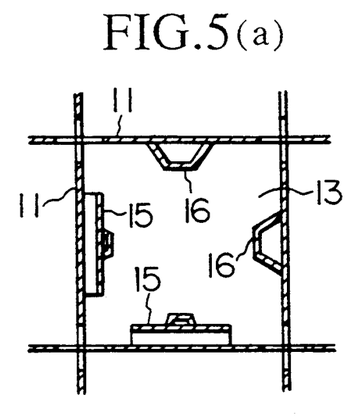
FIGS. 5(a) to 5(f) are sectional views of straps, showing the procedures of inserting a key member into a nuclear fuel assembly grid.
Figure 5B:
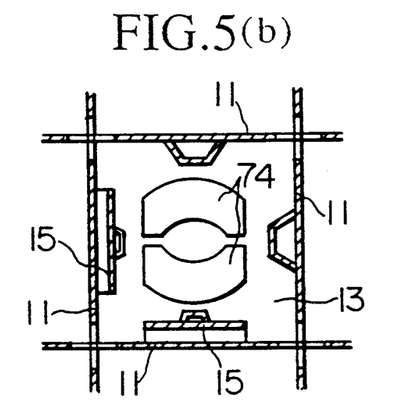
Figure 5C:
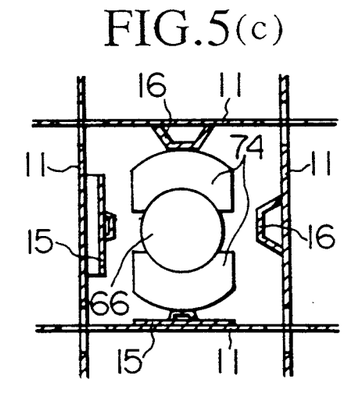

(3) Thereafter, the rod support 44 is further moved downwards to cause the rod members 66 to be inserted further into the tools 74 as shown in two-dot chain lines in FIG. 4. When each rod member 66 is inserted in the interior of the grid cell 13, the tool 74 accommodated in the cell 13 is enlarged, so that the springs 15 are deflected by the divided sleeve pieces of the tool 74 (FIG. 5c).

Figure 5D:
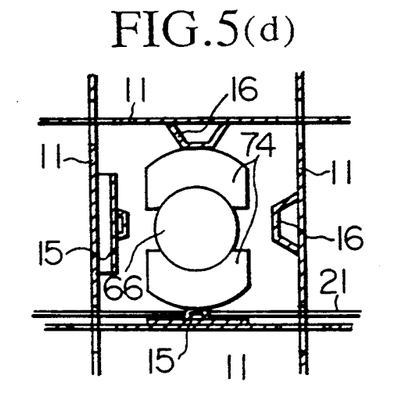

(4) Subsequently, the push-out member 94a is pivoted by the actuation of the cylinder 94b so that its prescribed end is brought into a position adjacent to the key member 21 at the insertion position in the key-cartridge 93, and then the cylinder 94 is actuated, so that the key member 21 is pushed out by the push-out member 94a towards the grid 5. The key member 21 is caused to further move forwards by the actuation of the rollers 95 and the forwarding mechanism 100 until the key member 21 is stopped by the stopper 96. In this condition, the key-cartridge 93 is moved to the position indicated by the two-dot chain line in FIG. 1. With these procedures, the key member 21 is inserted in a prescribed position in the grid 5 as shown in FIG. 5d.

Figure 5E:
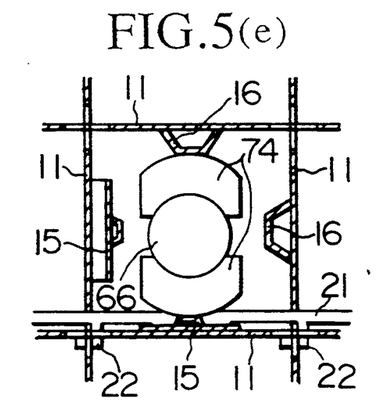

Then, the key member 21 is rotated and moved axially by the key-rotating mechanisms 97, to thereby bring the hooks 22 of the key member 21 into engagement with the ribs 23 (see FIG. 5e). More specifically, when the key-cartridge 93 is moved to its forward position, the key-rotating mechanism 97 disposed on the right side in FIG. 1 is situated at its lower position. After the key-cartridge 93 is moved back to its rearward position, the right key-rotating mechanism 97 is moved upwards and shifted towards the other key-rotating mechanism 97, whereby the key member 21 is held at its rearward end by the holding member 96. Then, the motors 97 of both of the key-rotating mechanisms are actuated to rotate the key member 21, and the cylinder is activated to shift the key member 21 in its axial direction.

(5) The hydraulic cylinder 46 is then driven to cause to the piston rod 65 to move upwards, so that the rod support 44 is elevated above the grid 5. In this situation, the upper roller 83 of the swing roller assembly 81 is brought into abutment with the surface 67a of the guide member 67 on the rod support 44, and therefore the lower roller 84 is held in abutment with the end 45a of the tool support 45 to press the same downwardly. Thus, the tool support 45 is prevented to move upwardly until the upper roller 83 is disengaged from the guide member 67.

(6) When the rod members 66 are withdrawn from the grid 5, the tools 74 accommodated in the grid 5 are disengaged from the springs 15 since their sleeve pieces are restored to their original positions away from the springs 15.

(7) When the rod support 44 and the tool support 45 are caused to move upwardly by a prescribed distance, the rod support 44 and the engaging bolts 76 of the suspender 75 are brought into engagement with each other to cause the tool support 45 to move upwardly, and hence the tools 74 are withdrawn from the grid 5.

(8) Thereafter, the moving device 34 is operated to move the tray 42 a prescribed distance to shift the grid 5 in a direction perpendicular to the supports 44 and 45 into a next position. Then, by the actuation of the hydraulic cylinder 46, the deflecting device is again operated in a manner similar to the foregoing, to thereby deflect the springs 15, and the key cartridge 93 is rotated about its axis by a prescribed angle, to thereby move another key member 21 to the insertion position. Then, the aforesaid operations are repeatedly carried out to insert another key member 21 into the grid 5 and rotate the same to maintain the springs 15 deflected, following which the deflecting tools and the rod members are removed from the grid cells 13 in a manner similar to the foregoing. By repeating the aforesaid operations, all of the key members 21 are thus inserted in the grid 5.

Figure 5F:
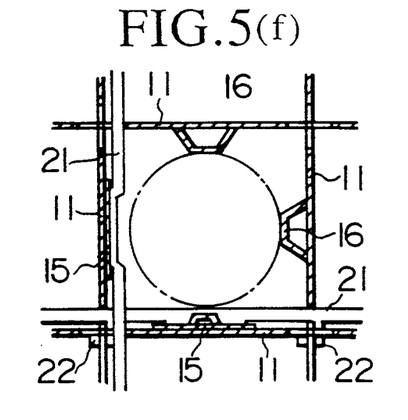

(9) Further, when the insertion of the key members 21 into the grid 5 from one side is completed, the holding means is actuated to rotate the tray 42 ninety degrees, and by repeating the aforesaid procedures, other key members 21 are inserted in the grid 5 in a direction perpendicular to the key members that have already been inserted. Thus, as shown in FIG. 5f, all of the springs 15 in the grid 5 are maintained deflected in a direction away from the dimples 16 opposing thereto.

(10) Then, the fuel rods 6 are inserted into the respective grid cells 13, following which the key members 21 are removed from the grid 5. Thus, the fuel rods 6 are securely fixed by being urged by the springs 15 towards the dimples 16 opposing thereto.

As described above, in the assembling apparatus 31 in accordance with the invention, the deflecting device comprises tools 74, rod members 66 releasably inserted in the tools 74 for sliding movement therealong, and drive means for moving the rod members to bring the same into urging engagement with the tubular member. Accordingly, the springs 15 are deflected in their proper acting direction, so that the deflecting operation can be carried out without causing any twisting or shifting to the springs 15.

Furthermore, since the deflecting device includes a linkage means for associating and dissociating the movement of the rod support 44 and that of the tool support 45, the assembling apparatus is very simple in construction. Moreover, the apparatus includes the maintaining device and the moving device in addition to the deflecting device, and hence all of the operations including the insertion of the key members 21 and the indexing of the grid 5 can be automatically carried out, thereby achieving substantial reduction in working time and cost.

Obviously, many modifications and variations of the present invention are possible in the light of the above teachings. It is therefore to be understood that within the scope of the appended claims, the invention may be practiced otherwise than as specifically described.

What is claimed is:

1. An apparatus for assembling a nuclear fuel assembly which includes a grid for supporting a plurality of fuel rods, said grid having a plurality of straps intersecting each other to define a plurality of grid cells therein, and a plurality of pairs of dimples and springs provided on the straps for supporting the fuel rods, the dimple and the spring being disposed in facing relation to each other, on wall portions of the straps, which cooperate with each other to define the grid cells, the dimple and the spring projecting into the grid cell, said apparatus comprising:

- deflecting means disposed adjacent to said grid for deflecting the spring away from the dimple opposing thereto;
- said deflecting means including a tubular member defining a plurality of circumferentially divided sleeve pieces, a rod member releasably inserted in said tubular member for sliding movement therealong, and drive means drivingly connected to said rod member for moving said rod member in said tubular member in a longitudinal direction thereof to bring the rod member into urging engagement with said sleeve pieces of the tubular member, whereby the sleeve pieces are deflected to be urged against the spring to deflect the same;
- said assembling apparatus further comprising:
- holding means for holding said grid;
- maintaining means disposed adjacent to said holding means for maintaining the spring deflected, said maintaining means including a key member adapted to be releasably inserted in said grid cell of said grid for maintaining the spring deflected, and inserting means for inserting said key member into said grid cell of said grid; and
- moving means attached to said holding means for moving said holding means into a shifted position, to thereby allow said maintaining means to insert another key member in another grid cell of said grid to maintain another spring deflected.

2. An assembling apparatus as recited in claim 1, wherein said inserting means includes supplying means for supplying the key member into an insertion position, and transfer means for moving the key member arranged in the insertion position into the grid cell.

3. An assembling apparatus as recited in claim 1, wherein said deflecting means further includes a first support member carrying said rod member and being movable toward and away from said grid, and a second support member carrying said tubular member and being movable toward and away from said first support member, said first support member and said second support member being operably associated with each other.

4. An assembling apparatus as recited in claim 3, wherein said drive means of said deflecting means includes a drive mechanism connected to said first support member for moving said first support member in a longitudinal direction of the rod member, and linkage means attached to said first support member and said second support member for associating the movement of said second support member with the movement of said first support member and dissociating the movement of the second support member therefrom.

5. An assembling apparatus as recited in claim 4, wherein said linkage means includes a connecting rod connected at one end to said first support member and at the other end to said second support member, said connecting rod being arranged such that said first support member and said second support member are movable toward and away from each other and that said second support member is movable following the movement of said first support member.

6. An assembling apparatus as recited in claim 5, wherein said linkage means further includes stopper means disposed adjacent to said first and second support members for stopping said second member in association with the movement of said first support member.

7. An apparatus for assembling a nuclear fuel assembly which includes a grid for supporting a plurality of fuel rods, said grid having a plurality of straps intersecting each other to define a plurality of grid cells therein, and a plurality of pairs of dimples and springs provided on the straps for supporting the fuel rods, the dimple and the spring being disposed in facing relation to each other, on wall portions of the straps, which cooperate with each other to define the grid cells, the dimple and the spring projecting into the grid cell, said apparatus comprising:

- deflecting means disposed adjacent to said grid for deflecting the spring away from the dimple opposing thereto, said deflecting means including a tubular member defining a plurality of circumferentially divided sleeve pieces, a rod member releasably inserted in said tubular member for sliding movement therealong, and drive means drivingly connected to said rod member for moving said rod member in said tubular member in a longitudinal direction thereof to bring the rod member into urging engagement with said sleeve pieces of the tubular member, whereby the sleeve pieces are deflected to be urged against the spring to deflect the same;
- wherein said deflecting means further includes a first support member carrying said rod member and being movable toward and away from said grid, and a second support member carrying said tubular member and being movable toward and away from said first support member, said first support member and said second support member being operably associated with each other.

8. An assembling apparatus as recited in claim 7, wherein said inserting means includes supplying means for supplying the key member into an insertion position, and transfer means for moving the key member arranged in the insertion position into the grid cell.

9. An assembling apparatus as recited in claim 8, wherein said drive means of said deflecting means includes a drive mechanism connected to said first support member for moving said first support member in a longitudinal direction of the rod member, and linkage means attached to said first support member and said second support member for associating the movement of said second support member with the movement of said first support member and dissociating the movement of the second support member therefrom.

10. An assembling apparatus as recited in claim 9, wherein said linkage means includes a connecting rod connected at one end to said first support member and at the other end to said second support member, said connecting rod being arranged such that said first support member and said second support member are movable toward and away from each other and that said second support member is movable following the movement of said first support member.

11. An assembling apparatus as recited in claim 10, wherein said linkage means further includes stopper means disposed adjacent to said first and second support members for stopping said second member in association with the movement of said first support member.

12. An apparatus for assembling a nuclear fuel assembly which includes a gird for supporting a plurality of fuel rods, said grid having a plurality of straps intersecting each other to define a plurality of grid cells therein, and a plurality of pairs of dimples and springs provided on the straps for supporting the fuel rods, the dimple and the spring being disposed in facing relation to each other, on wall portions of the straps, which cooperate with each other to define the grid cells, the dimple and the spring projecting into the grid cell, said apparatus comprising:

deflecting means disposed adjacent to said grid for deflecting the spring away from the dimple opposing thereto, said deflecting means including a tubular member defining a plurality of circumferentially divided sleeve pieces, and a rod member releasably inserted in said tubular member for sliding movement therealong;

first and second parallelly positioned support members, said rod member being attached to said first support member, said second support member having an aperture aligned with said rod member so as to permit the insertion of said rod member through said aperture, said tubular member being attached to said second support member and being aligned with said aperture for permitting said rod member inserted through said aperture to be inserted into said tubular member for permitting said sliding movement; and drive means connected to said first support member for moving said rod member in said tubular member in a longitudinal direction thereof to bring the rod member into urging engagement with said sleeve pieces of the tubular member, whereby the sleeve pieces are deflected to be urged against the spring to deflect the same.

13. An assembly apparatus according to claim 12, further comprising means for permitting the relative movement of said first and second support members and permitting the second support member to follow the movement of the first support member.

* * * * *